(12) United States Patent
Gächter et al.

(10) Patent No.: US 7,480,316 B2
(45) Date of Patent: Jan. 20, 2009

(54) GEODESIC DEVICE COMPRISING A LASER SOURCE

(75) Inventors: Bernhard Gächter, Balgach (CH); Bernhard Braunecker, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 30 days.

(21) Appl. No.: 10/572,254

(22) PCT Filed: Sep. 17, 2004

(86) PCT No.: PCT/EP2004/010478
§ 371 (c)(1), (2), (4) Date: Sep. 1, 2006

(87) PCT Pub. No.: WO2005/029114
PCT Pub. Date: Mar. 31, 2005

(65) Prior Publication Data
US 2007/0053402 A1   Mar. 8, 2007

(30) Foreign Application Priority Data
Sep. 18, 2003   (EP)   ................... 03021085

(51) Int. Cl.
*H01S 3/098* (2006.01)
(52) U.S. Cl. ........................... 372/18; 372/19
(58) Field of Classification Search ............ 372/18, 372/19
See application file for complete search history.

(56) References Cited

U.S. PATENT DOCUMENTS

| | | | |
|---|---|---|---|
| 3,696,310 A | 10/1972 | Paoli et al. | |
| 5,237,577 A * | 8/1993 | Keller et al. | 372/11 |
| 5,594,543 A | 1/1997 | de Groot et al. | |
| 5,703,897 A | 12/1997 | Welch et al. | |
| 5,719,664 A * | 2/1998 | Besesty et al. | 356/5.01 |
| 6,108,355 A | 8/2000 | Zorabedian | |
| 6,188,705 B1 | 2/2001 | Krainak et al. | |
| 6,449,301 B1 | 9/2002 | Wu et al. | |
| 6,625,182 B1 * | 9/2003 | Kuksenkov et al. | 372/19 |
| 6,822,978 B2 * | 11/2004 | Kafka et al. | 372/18 |

(Continued)

FOREIGN PATENT DOCUMENTS

EP   1326105   7/2003

(Continued)

OTHER PUBLICATIONS

Lord et al: "Using fibre gratings to stabilise laser diode wavelength under modulation for atmospheric lidar transmitter," Electr. Lett. 32, Nr 6, S. 561-563 (1996).

(Continued)

*Primary Examiner*—Armando Rodriguez
(74) *Attorney, Agent, or Firm*—Workman Nydegger

(57) ABSTRACT

A laser source is used in a geodesic device to improve the emission of laser light, in which the laser diodes emitting multimodal radiation are influenced by a mode-selective component such that the laser radiation emitted by the laser source has monomodal character. An edge emitter or a vertical semiconductor emitter with an external cavity, is hence used, in which a mode selective component is arranged, for example, a monomode fibre or resonator mirror, which has the effect of a mode-selective resonator construction. Components with negative dispersion can be used for pulse compression to compensate for the greater pulse duration generated by the lengthened cavity.

26 Claims, 6 Drawing Sheets

U.S. PATENT DOCUMENTS

| | | | |
|---|---|---|---|
| 6,982,997 B1 * | 1/2006 | Jiang et al. ..................... 372/6 |
| 2002/0064353 A1 | 5/2002 | Yokoyama et al. |
| 2002/0196548 A1 | 12/2002 | Kuznetsov |
| 2003/0133093 A1 | 7/2003 | Asaka et al. |

FOREIGN PATENT DOCUMENTS

| | | |
|---|---|---|
| WO | 00/16122 | 3/2000 |
| WO | WO 00/60388 | 10/2000 |

OTHER PUBLICATIONS

Repasky et al: "Tunable external-cavity diode laser based on integrated waveguide structures," Opt. Eng. 42(8), S. 2229 (Aug. 2003).

* cited by examiner

GEODESIC DEVICE COMPRISING A LASER SOURCE

The invention relates to a geodesic device comprising a laser source according to the precharacterizing clause of claim 1.

In many geodesic applications, the emission of laser light is required or advantageous. This applies, for example, to distance measurement, target illumination or the measurement of physical properties, such as, for example, for dispersion correction or in LIDAR systems for analyzing atmospheric pollution. Suitable methods and devices for distance measurement are described, for example, in EP 0 738 899 B1 and the European Patent Application No. 03003738 still unpublished on the date of filing.

Regarding the emission characteristic of the laser radiation, different requirements are set by the various applications. In general, however, the distances to be bridged or to be measured require powers of the laser sources in continuous or at least pulsed operation which are as high as possible. If a position or a distance has to be determined, there are even further requirements in order to be able to measure with accuracies in the millimeter or submillimeter range. Examples of this are interferometric surveying systems which have to ensure accuracies in the region of 20 μm over a distance of about 60 meters, or air-supported scanning systems with a distance of 6 km and a required accuracy of about 30 cm.

In this context, the term "geodesic device comprising a laser source" is always to be understood as meaning generally a measuring instrument or an instrument which is used in association with measurements, such as, for example, a telemeter, a LIDAR system or a theodolite, this emitting laser radiation and serving for the measurement or checking of data relating to space. In particular, this relates to the measurement of distance and/or direction or angles to a reference point or measuring point. In addition, however, other or supplementary objects can also be achieved by the radiation source, such as, for example, the provision of a visible laser beam for analytical purposes, for marking a target or for representing the point of incidence of a laser in the non visible spectral range. Here, such a geodesic device is to be understood in particular as meaning three-dimensional scanning systems, theodolites and also so-called total stations as tachometer with electronic angle measurement and electrooptical telemeter. The invention is also suitable for use in specialized apparatuses having a similar functionality, for example in military observation, fire control or aiming circle applications or in the monitoring of industrial structures of processes; these systems are therefore also covered by the term "geodesic device comprising a laser source".

The resulting requirements which the laser emission of geodesic devices has to meet for this important field of use relate to the power and the mode structure. While powers in the small mW range are achieved in the case of continuous emission, it is advantageous, for distance measurements over relatively large distances, to achieve powers in the region of a few 10 W, which can be achieved in pulsed operation in particular by short but high-energy pulses. In addition, a beam cross-section which is as small and homogeneous as possible should be provided so that resolution of small structures is also possible. The beam cross-section or the beam profile should as far as possible remain constant or change only slightly over the total measuring distance. For this reason, it is advantageous to use the emission of the $TEM_{oo}$ mode and to suppress the occurrence of higher modes since these have a greater dimension and structuring. Such a mode has an ideal Gaussian profile and no phase shifts in an electrical field occur transversely to the beam, so that the beam is completely coherent in three dimensions.

In geodesic devices of the prior art, laser diodes are frequently used as laser sources. However, these semiconductor lasers have the disadvantage that they emit in multimode operation and have a geometrically disadvantageous beam cross-section as an edge emitter.

Thus, various approaches exist in the prior art for converting the emission of a laser diode by suitable beam shaping means into an advantageous shape.

For example, WO 01/84077 discloses an optical telemeter which deflects the rays of an edge-emitting laser diode by a downstream optical beam shaping system, and guides them to the aperture of an objective lens, in such a way that they substantially fill said aperture.

However, the emission of the laser diode still has a multimode characteristic.

The combination of the emission of many individual laser diodes of an array into a common beam, which is also possible for increasing the power, also has the disadvantage of poor coherence.

For avoiding these disadvantages, it is in principle possible also to use other laser types, for example microchip, solid-state lasers pumped by semiconductor lasers in single-mode operation, in geodesic devices. However, these have the disadvantage of large dimensions, high energy consumption and a disadvantageous operating characteristic, for example owing to thermal effects. Consequently, the suitability of such solutions for use in practice for surveying in the field is limited.

Although the use of pure single-mode laser diodes leads to a coherent emission having a virtually Gaussian energy distribution and hence to a fundamentally suitable beam profile, the powers of commercially available single-stripe single-mode laser diodes or tapered single-stripe single-mode laser diodes which are achievable in the visible spectral range have been too low to date. In the region of high powers, as could be achieved, for example, by pulsed operation of these laser diodes, the beam experiences deviations from the desired Gaussian profile. Such pulsed operation can in certain circumstances also lead to further disadvantages, such as, for example, a reduced life due to hole burning, and to the occurrence of further modes.

An object of the present invention is to provide a geodesic measuring device comprising a laser source, the emission of which device has an improved beam quality for identical power or a higher power for identical beam quality or both higher power and improved beam quality.

A further object of the present invention is to permit structural improvements with respect to size, complexity, energy consumption and/or design of a geodesic measuring device comprising a laser source.

A further object of the present invention is to permit the use of the possible variations in the design of the laser emission which are achievable by commercially available laser diodes also for geodesic devices.

A further object of the present invention is to permit influencing of the emitted radiation, for example, with respect to the shape of the emission wavefront, for semiconductor diodes.

These objects are achieved, according to the invention, by the features of claim 1 or by features of the subclaims or these achievements are further developed.

The invention relates to the influencing of the radiation field in the resonator of the laser source of a geodesic device.

According to the invention, the radiation-generating element used in the resonator is a semiconductor laser diode which would emit in the multimode without further measures but radiation of which is influenced by a mode-selective component in such a way that the radiation emitted by the radiation source has a monomodal characteristic. Laser diodes suitable for this purpose are commercially available in a large selection and variation. In particular, the available wavelength ranges extend from the infrared into the violet range so that a spectral emission tailored to the intended use is possible.

The laser diode is introduced as a component into a resonator or is an end of such a resonator, so that the cavity is also defined by an external portion outside the laser diode. The radiation field propagating in this cavity or the resonator is influenced by the mode-selective component in such a way that a monomodal emission of the radiation source occurs and/or the laser diode itself is caused to produce a monomodal emission.

The laser diode used may be a conventional edge emitter or a vertically emitting diode, such as, for example, a vertical cavity surface emitting laser (VCSEL) or a Novalux extended cavity surface emitting laser (NECSEL). The design of such an NECSEL is disclosed, for example, in WO 01/67563 A2. The advantage of these vertically emitting laser diodes is, inter alia, that it is possible to dispense with downstream beam shaping owing to the substantially circular beam cross-section.

In order to permit a use of such a commercial laser diode comprising an external cavity, modifications and adaptations must, if required also be made. In particular, it may be necessary to remove mirrors or coatings which define the resonator of the laser diode. For example, plasma etching methods can be used for such tasks. In the case of conventional, edge emitting laser diodes, however, in general no mirrors are mounted but only the end faces perpendicular to the transition are polished. Here, it may be necessary to reduce the reflective effect, for example in the form of an anti reflection coating.

In principle, the components customary in general laser physics can be used as the mode-selector element, such as, for example, suitably shaped mirrors for designing unstable or mode-selective resonators, saturatable absorbers or interferometers. In this context, however, in particular single-mode fibers or apertures may be used as mode-selective components. By means of these components, the generation of higher modes or stimulation of oscillations in higher modes is suppressed within the resonators so that the circulating radiation pulse is substantially monomodal.

The resonator or the cavity is defined by a mirror and a partly transparent mirror, it being possible for the completely reflective side of the laser diode to be used as one of the resonator mirrors. For inputting the radiation into and outputting the radiation out of the mode-selective element, an appropriate optical system comprising lenses or cylindrical lenses may be used, but, according to the invention, fibers or reflective or diffractive elements may also be used.

Because the resonator length is greater in comparison with the unchanged laser diode, it may be advantageous to compensate the resulting increase in the pulse length. In order to achieve the negative dispersion required for this purpose, components generally used in laser physics may be used. Thus, for example, pairs of prisms or of gratings or a Gires Tournois Interferometer (GTI) permit a suitable pulse compression. In addition such and other elements having a pulse-influencing effect, such as, for example, also saturatable absorbers, can be used for shaping and design of the radiation field in the cavity or of the pulse with respect to time and space. By using an external cavity, the possibilities for designing such components can, according to the invention, also be used in association with semiconductor lasers and in geodesic devices.

For amplifying the radiation generated in the beam-producing laser diode, an amplifier present outside the resonator may be used. The use of a second multimode laser diode which is used without reflective coatings or with antireflection coatings in the transmission mode in the form of a master oscillator power amplifier (MOPA) is advantageous for this purpose. In this configuration, it may be advantageous to stabilize the wavelength of the radiation-producing laser diode serving as the master oscillator, so that said wavelength corresponds exactly to the maximum of the spontaneous emission of the amplifier.

For highly accurate distance measurements, it is advantageous if the radiation source provides radiation having a well defined optical pulse shape. This should have a flat, non-curved emission wavefront and a pulse duration of less than 500 ns.

Owing to the dimensions of the components and the small beam cross-sections and mode profiles, highly accurate and stable positioning is a critical requirement. All components of the laser source and optionally also downstream optical components can advantageously therefore be mounted on a common baseplate or can be realized on a common substrate. An optical component or total system suitable with regard to mounting requirements and the necessary accuracy of positioning is described in DE 195 33 426 A1. Suitable methods for fixing miniaturized components on a base plate by soldering are described in WO 99/26754 and in the European Patent Application No. 02026648 still unpublished on the date of filing. A suitable method for fixing a miniaturized component on a support plate, in particular for fine adjustment of optical components, is described, for example, in the European Patent Application No. 02026650 still unpublished on the date of filing.

A geodesic device according to the invention and laser sources according to the invention which are suitable for it are described in more detail below purely by way of example with reference to working examples shown schematically in the drawings. Specifically, FIG. 1 shows the schematic diagram of a geodesic device according to the invention, comprising a laser source according to the invention;

Figure 12:
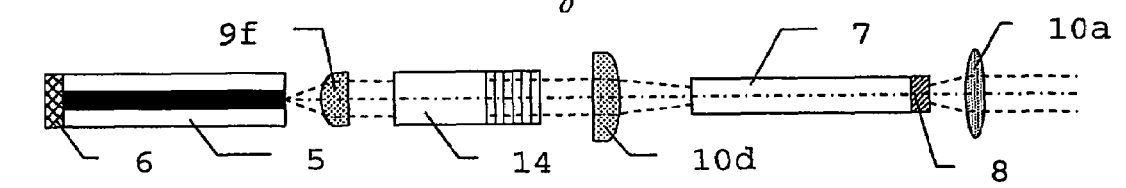
Figure 12:
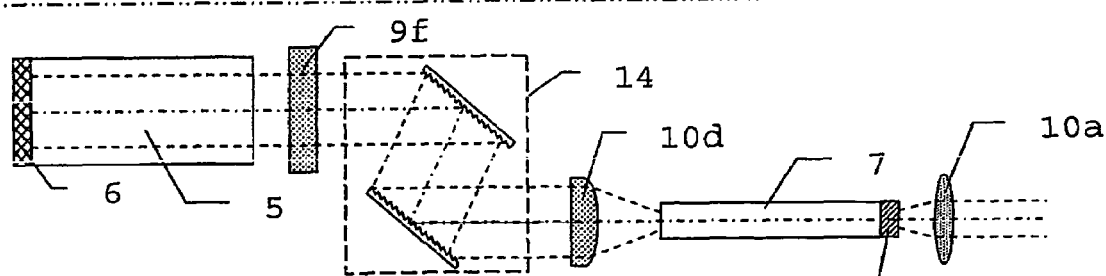
Figure 13:
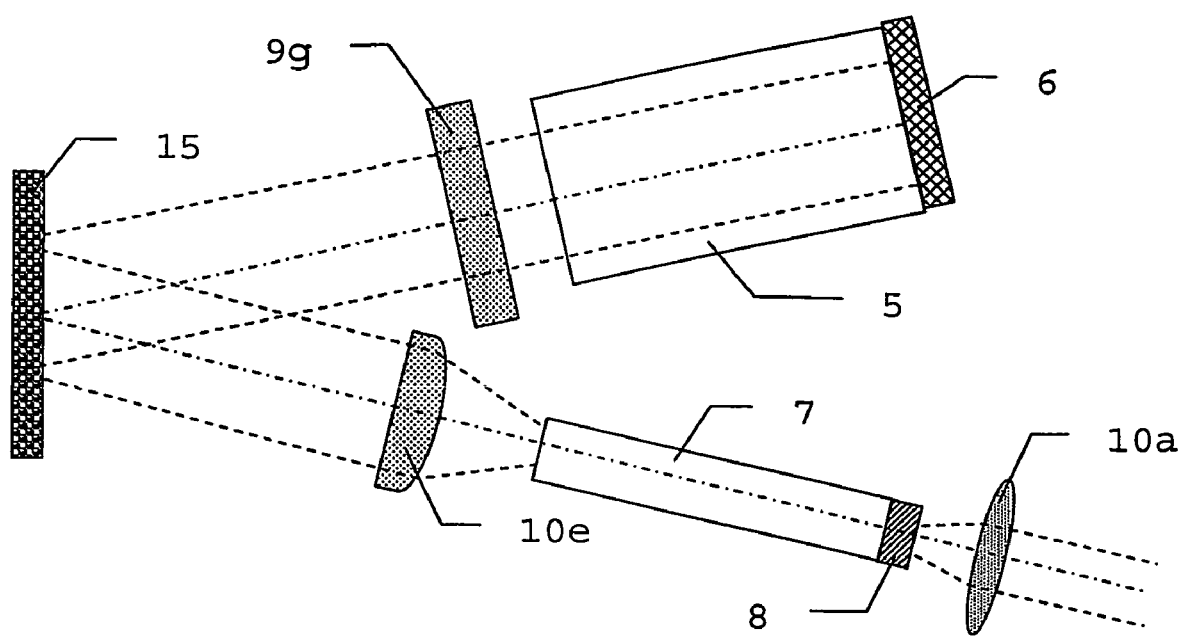

FIG. 12 shows the schematic diagram of an eleventh laser source according to the invention, comprising an edge-emitting laser diode, a single-mode fiber as a mode-selective component and a pair of gratings for pulse compression; and FIG. 13 shows the schematic diagram of a twelfth laser source according to the invention, comprising an edge-emitting laser diode, a single-mode fiber as a mode-selective component, and a Gires Tournois Interferometer for pulse compression.

Figure 1:
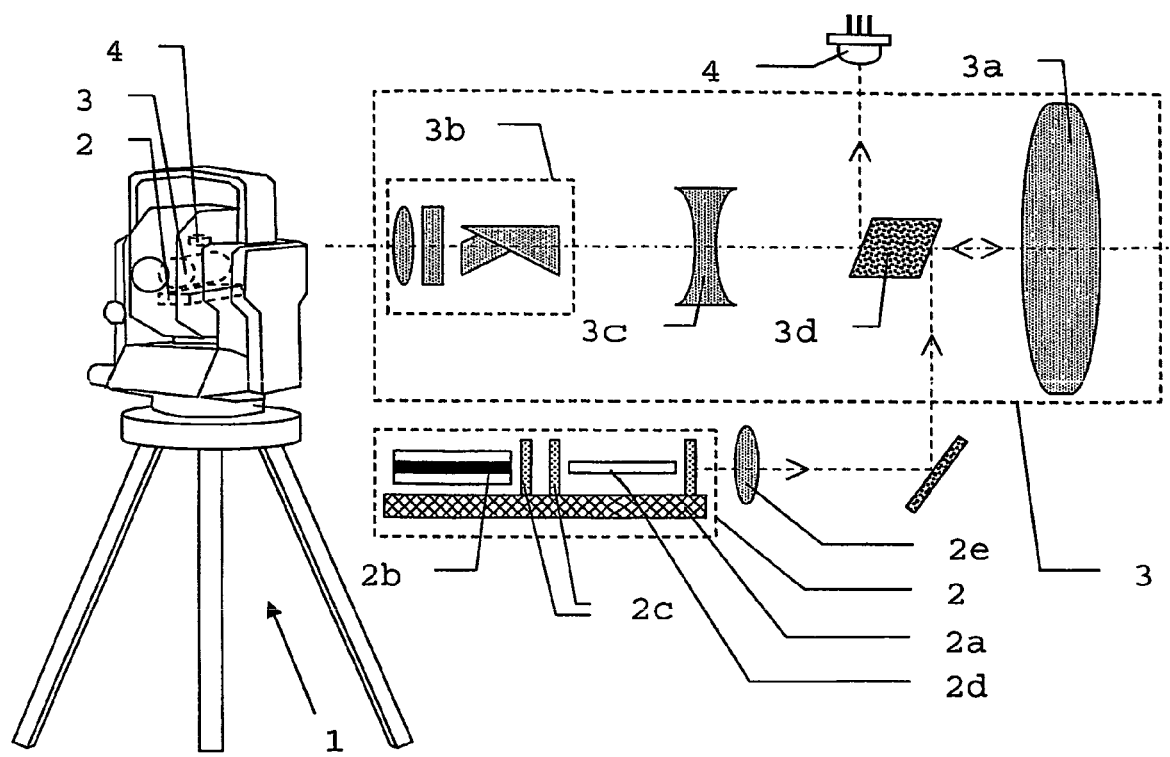

FIG. 1 shows a tachometer as an example of a geodesic device 1 according to the invention, together with a more detailed explanation of some of its components in the form of a detailed diagram. A laser source 2, an optical system 3 for detecting targets to be surveyed and a receiver 4 are present as components in the housing of the device 1.

The laser source 2 has a baseplate 2a on which all components are mounted. The laser radiation is emitted by a radiation-producing laser diode 2b and passed via an input/output optical system 2c into a mode-selective component 2d, these components being present within a cavity so that the radiation-producing laser diode 2b has an external cavity. The radiation emerging from the cavity and hence from the laser source 2 can be influenced by a downstream beam-shaping optical system 2e.

The optical system 3 for detecting targets to be surveyed has an objective lens 3a and an eyepiece unit 3b. Between these components are a focusing member 3c and a reflective deflecting means 3d, with the aid of which the radiation originating from the laser source 2 is input into the beam path of the optical system 3 and is emitted via the objective lens 3a.

Radiation reflected back by a target is in turn picked up by the objective lens 3a and a part of the radiation is guided by the reflective deflecting means 3d onto a receiver 4.

In this arrangement, the radiation of the laser source 2 in cooperation with the receiver 4 can be used, for example, for a distance measurement to a target. The example shown is only one of many possible embodiments of geodesic devices according to the invention and serves for the exemplary illustration of a possible cooperation of components.

Figure 2:
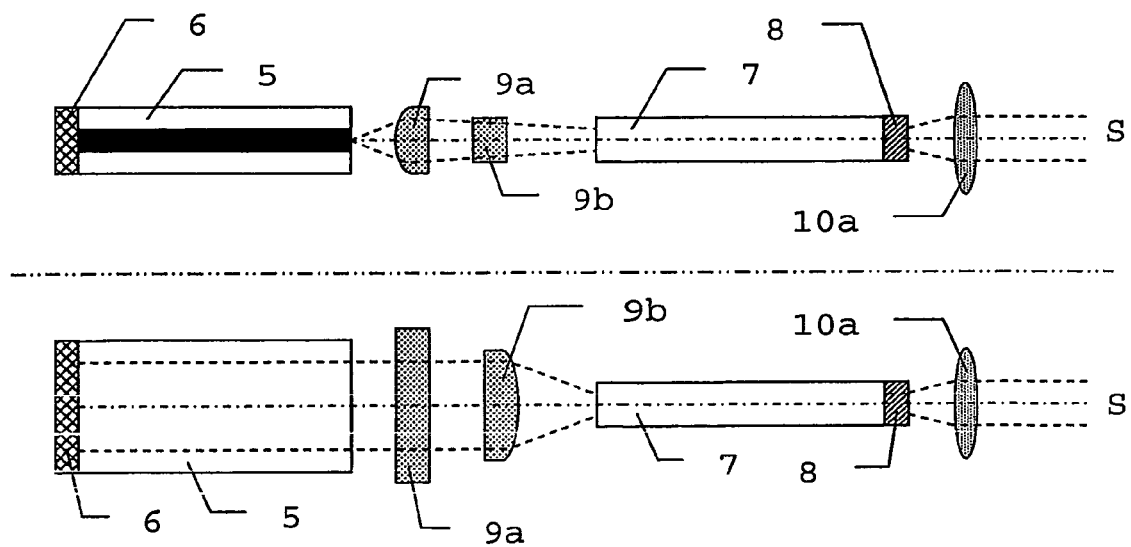
FIG. 2 shows the schematic diagram of a first laser source according to the invention, comprising a single-mode fiber as a mode-selective component.

A first laser source according to the invention, comprising a single-mode fiber as a mode-selective component, is shown schematically in FIG. 2. Here, as well as in the following figures, the upper picture shows a side view of the setup, which corresponds to the fast axis, whereas the lower picture corresponds to a plan view and hence to the slow axis. The laser source has, as a radiation-producing element, an edge-emitting laser diode 5, one side of which forms a resonator mirror 6. Here too, an additional flat mirror or a coating can optionally be applied to the lateral surface of the laser diode. The emission of this edge-emitting laser diode 5 is input via two cylindrical lenses 9a and 9b into a single-mode or monomodal fiber 7 as a mode-selective component. This anamorphotic design of the input/output optical system results from the strong asymmetry of the emission. The monomodal fiber 7 is terminated at one end by an output mirror 8 which thus constitutes a second resonator mirror and thus defines the end of the external cavity for the edge-emitting laser diode 5. As a result of the reflections in the monomodal fiber 7, the proportion of higher modes in the radiation field is reduced and, after the reflection at the output mirror 8, substantially monomodal radiation is fed back into the edge-emitting laser diode 5. As a result of this design, only one oscillation mode is stimulated in the cavity owing to the losses in the monomodal fiber 7, which mode is amplified in the resonator cycle and is emitted via the output mirror 8 and optionally a downstream lens 10a as usable laser radiation S.

The monomodal fiber 7 may be in the form of a fiber having an inside differing geometrically from the cylindrical shape, the reflection-determining region or such a boundary layer in the interior of the fiber being considered as the inside. This inside may have in particular a conical or curved shape, it also being possible to achieve the latter by a suitable deformation of a fiber having a cylindrical shape. Alternatively or in addition, the monomodal fiber 7 may also be in the form of a gradient fiber having a refractive index profile which is variable in the fiber direction, resulting in an effect similar to the conical shape of the inside. As a result of this special shaping or design, mode-selection according to the invention can be effected.

The monomodal fiber 7 can, for example, be in the form of an optical fiber having an inside differing from the geometry of the ideal cylindrical shape. As a result of the choice of reflection conditions which can thus be realized, the propagation of the different modes in the fiber can be influenced so that higher modes are suppressed or the stimulation of oscillation in said modes in the resonator is prevented. Suitable deviations are, for example, the conical shape of the inside or a slight curvature of the fiber. The monomodal fiber 7 can, however, also be optimized with respect to the transmission of selected modes without changing geometrical shapes. An example of this is the formation as a gradient fiber having a refractive index profile variable in the fiber direction.

Figure 3:
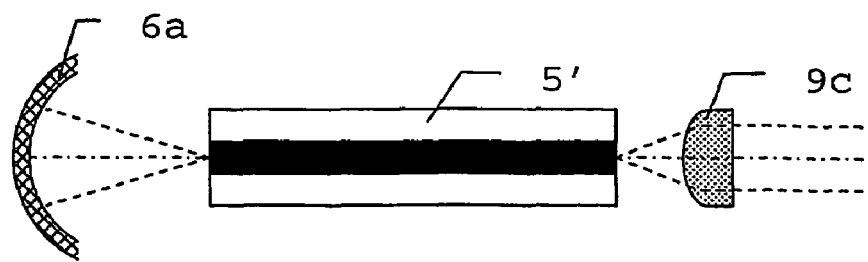
FIG. 3 shows the schematic diagram of a second laser source according to the invention, comprising a first suitable resonator mirror arrangement as a mode-selective component.
Figure 3:
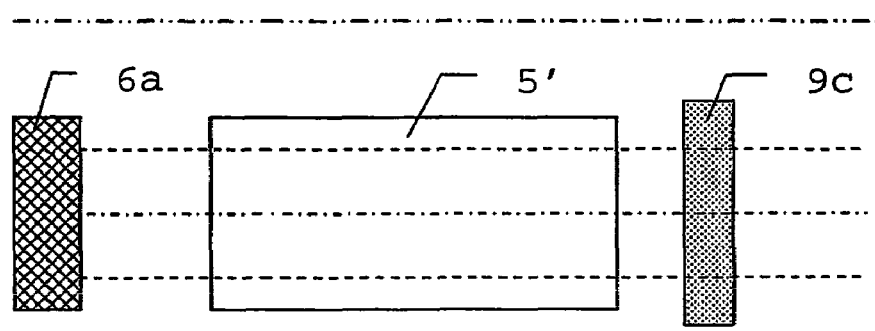

FIG. 3 shows the schematic diagram of a second laser source according to the invention, comprising a first suitable resonator mirror arrangement as a mode-selective component. In contrast to the embodiment shown in FIG. 2, the laser source comprising an edge-emitting laser diode 5' is caused to emit monomodal radiation by a special resonator mirror design in the cavity. That side of the edge-emitting laser diode 5' which acts as the resonator mirror in FIG. 2 is designed here to be transparent and the cavity uses a separate, external hollow mirror as resonator mirror 6a, by means of which, together with the flat output mirror of the monomodal fiber, shown in FIG. 2, or a reflective effect of the opposite side of the laser diode, the property of a hemispherical or hemiconcentric resonator is achieved. In such a setup, higher modes are damped compared with the basic mode provided with lower losses. The greatly divergent emission of the edge-emitting laser diode 5' can be collimated by a cylindrical lens 9c in the direction of the fast axis.

Figure 4:
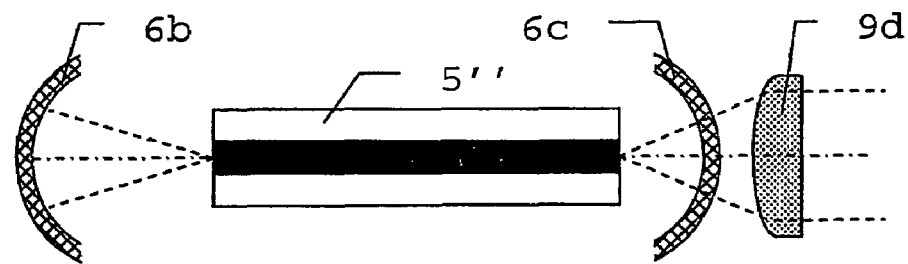
FIG. 4 shows the schematic diagram of a third laser source according to the invention, comprising a second suitable resonator mirror arrangement as a mode-selective component.
Figure 4:
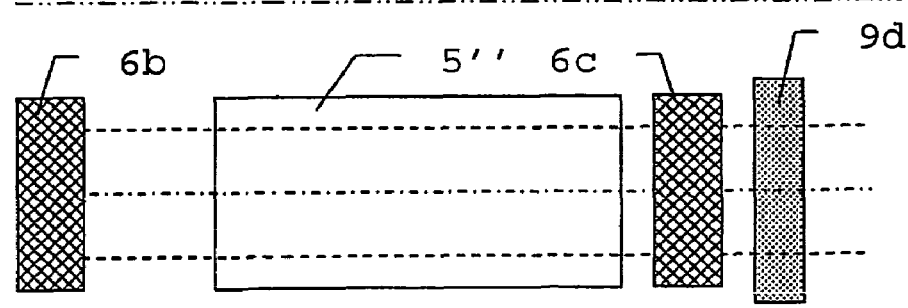

A third laser source according to the invention, comprising a second suitable resonator mirror arrangement as a mode-selective component, is shown in FIG. 4. The edge-emitting laser diode 5" is modified so that it no longer has reflective sides. The cavity is now defined by two hollow mirrors as resonator mirrors 6b and 6c, these together acting as the mode-selective component and an emission being achieved because of the partly transparent properties of the resonator mirror 6c. By means of this setup, the external cavity is in the form of a confocal resonator. The divergent radiation passing through the resonator mirror 6c is collimated by a cylindrical lens 9b in the direction of the fast axis.

Figure 5:
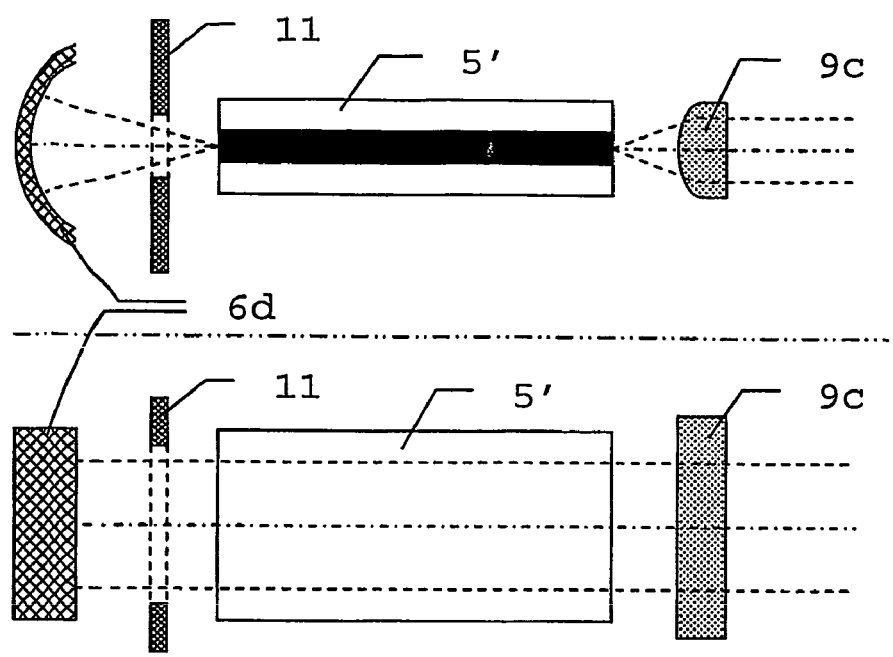
FIG. 5 shows the schematic diagram of a fourth laser source according to the invention, comprising an aperture as a mode-selective component.

A fourth laser source according to the invention is shown in FIG. 5, an aperture 11 being used as a mode-selective component. This embodiment has a setup similar to the embodiment shown in FIG. 3 and comprises edge-emitting laser diode 5' and hemispherical resonator. An aperture 11, the opening of which displays a damping effect for extensive, higher modes and hence enhances the mode selection of the embodiment shown in FIG. 3 is introduced between the resonator mirror 6d in the form of a hollow mirror and the edge-emitting laser diode 5'. The emission of the edge-emitting laser diode 5' can be collimated by a cylindrical lens 9c in the direction of the fast axis.

Figure 6:
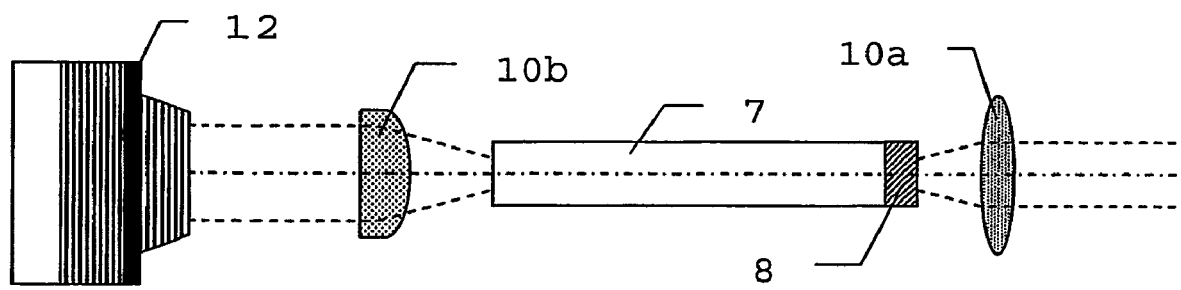
FIG. 6 shows the schematic diagram of a fifth laser source according to the invention, comprising a vertical emitting laser diode (VCSEL) as a radiation-producing laser diode and a single-mode fiber as a mode-selective component.

FIG. 6 shows the schematic diagram of a fifth laser source according to the invention, comprising a vertically emitting laser diode (VCSEL) 12 as a radiation-producing laser diode and a monomodal fiber 7 as a mode-selective component. The vertically emitting laser diode (VCSEL) 12 is modified in a manner analogous to an edge-emitting laser diode with regard to the reflective effect of its surface, in order to enable it to be used in a laser source according to the invention. Depending on the design, it may be necessary for existing mirrors, which, for example, are in the form of distributed Bragg reflector (DBR), to be removed or to have their transmission increased in order to permit feedback of the radiation field into the vertically emitting laser diode (VCSEL) 12. A suitable method for removing coatings or mirrors is available, for example, in the form of plasma etching. In the case of a vertically emitting laser diode (VCSEL) 12, it is advantageous that the emission has a round cross-section and generally also a larger area in comparison with edge-emitting laser diodes. The emitted radiation is input via a lens 10b into a monomodal fiber 7 which is provided at its end with a partly transparent output mirror 8. The radiation emerging from this output mirror 8 can be collimated by means of a lens 10a. Instead of the VCSEL mentioned, it is also possible, according to the invention, to use a special embodiment of a vertically emitting laser, such as, for example, an NECSEL.

FIG. 7 to FIG. 11 show embodiments in which the embodiments shown in FIG. 2, FIG. 5 and FIG. 6 are connected to an amplifying laser diode in a master oscillator power amplifier configuration. In all these configurations, the cavity is down-circuit of an amplifying laser diode, which in this case is in the form of a conventional edge emitter, in which the reflective effect of the lateral surfaces was eliminated and the transmission was maximized. This laser diode is therefore used only as an amplifying medium without being a component of a resonator.

Figure 7:
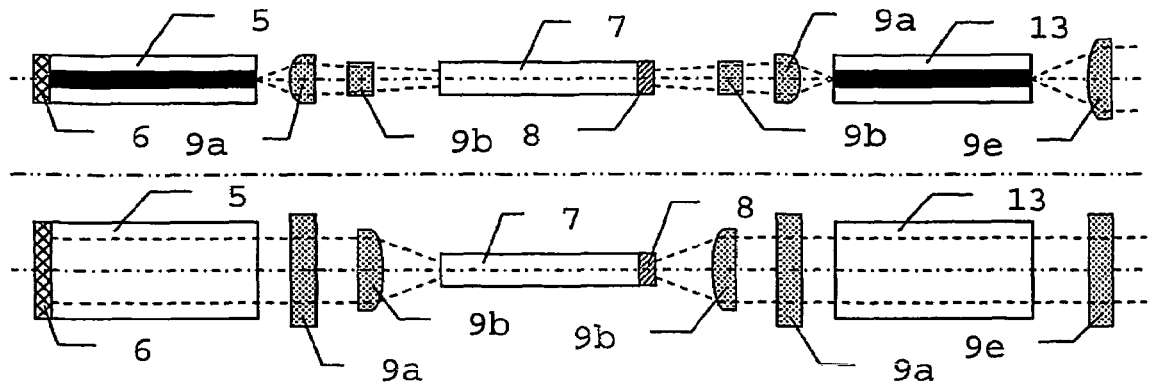
FIG. 7 shows the schematic diagram of a sixth laser source according to the invention, comprising an edge-emitting laser diode, a single-mode fiber as a mode-selective component and a laser diode as an amplifier.

FIG. 7 shows the schematic diagram of a sixth laser source according to the invention, comprising an edge-emitting laser diode 5, a monomodal fiber 7 as a mode-selective component and an amplifying laser diode 13. The cavity of the laser source has an edge-emitting laser diode 5 with resonator mirror 6, the cylindrical lenses 9a and 9b and a monomodal fiber 7 with output mirror 8. The radiation emitted from this cavity is input via two further cylindrical lenses 9b and 9a into an amplifying laser diode 13, after passing through which the radiation can be collimated again by a cylindrical lens 9e.

Figure 8:
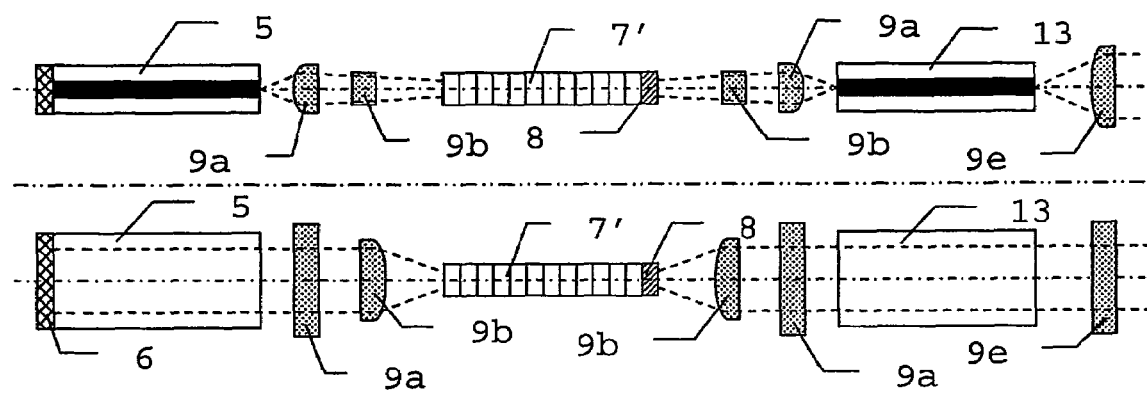
FIG. 8 shows the schematic diagram of a seventh laser source according to the invention, comprising an edge-emitting laser diode, a distributed grating in a fiber as a mode-selective component and a laser diode as an amplifier.

FIG. 8 shows the schematic diagram of a seventh laser source according to the invention, comprising an edge-emitting laser diode 5, a distributed grating as a structure periodic in space in a monomodal or multimodal fiber 7' acting as a mode-selective component and an amplifying laser diode 13. The cavity of the laser source has an edge-emitting laser diode 5 with resonator mirror 6, the cylindrical lenses 9a and 9b and a fiber 7' with integrated distributed grating or another structure periodic in space and an output mirror 8. The radiation emitted from this cavity is input via two further cylindrical lenses 9b and 9a into an amplifying laser diode 13, after passing through which the radiation can be collimated again by a cylindrical lens 9e. Because of the structure which is periodic in space, the wavelength can be further selected or the spectral width can be reduced. A prism may also be integrated for reducing the spectral width of the radiation.

Figure 9:
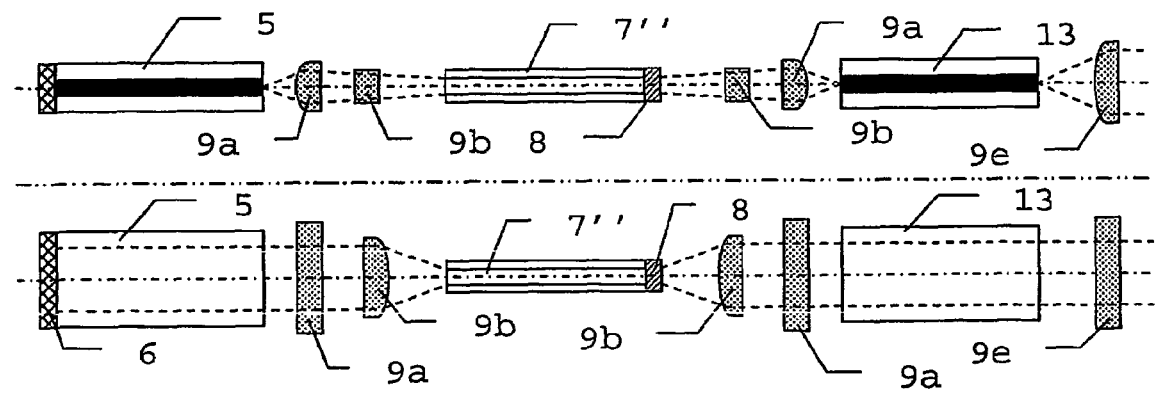
FIG. 9 shows the schematic diagram of an eighth laser source according to the invention, comprising an edge-emitting laser diode, a photonic fiber as a mode-selective component and a laser diode as an amplifier.

FIG. 9 shows the schematic diagram of an eighth laser source according to the invention, comprising an edge-emitting laser diode 5, a photonic fiber 7'' as a mode-selective component and an amplifying laser diode 13. The cavity of the laser source has an edge-emitting laser diode 5 with resonator mirror 6, the cylindrical lenses 9a and 9b and a photonic fiber 7'' for example a photonic band gap (PBG) fiber or a photonic crystal fiber (PCF), with output mirror 8. The radiation emitted from this cavity is input via two further cylindrical lenses 9b and 9a into an amplifying laser diode 13, after passing through which the radiation can once again be collimated by a cylindrical lens 9e. Because of the photonic fiber, the modes can be formed or selected. A fiber having a hollow core permits a high power. In principle, fibers having suitable adapted cross-sections, such as, for example, a rectangular cross-section, can be used for achieving a mode-selective effect.

Figure 10:
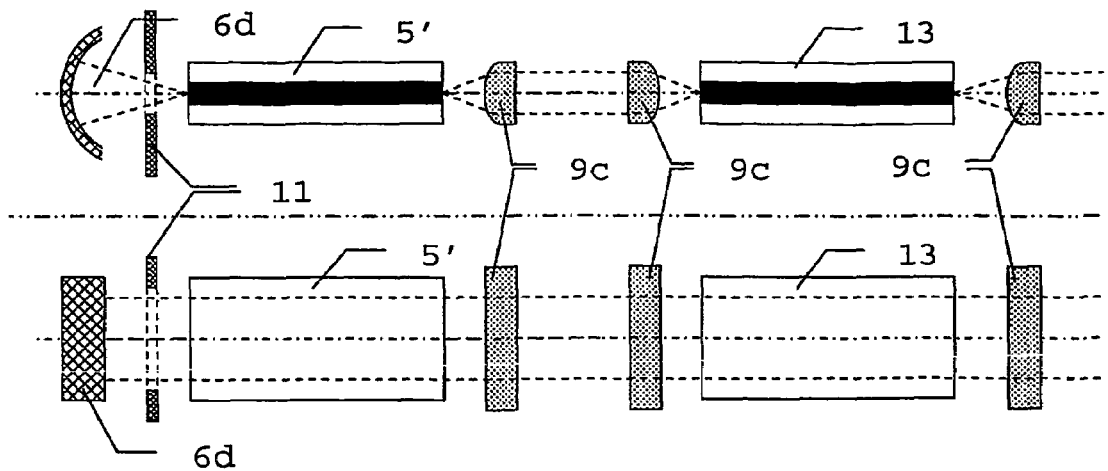
FIG. 10 shows the schematic diagram of a ninth laser source according to the invention, comprising an edge-emitting laser diode, an aperture as a mode-selective component and a laser diode as an amplifier.

FIG. 10 shows the schematic diagram of a ninth laser source according to the invention, comprising an edge-emitting laser diode 5' an aperture 11 as a mode-selective component and an amplifying laser diode 13. The laser source cavity designed as a hemispherical resonator has an edge-emitting laser diode 5' with a hollow mirror as resonator mirror 6d and an aperture 11. The radiation emitted by edge-emitting laser diode 5' is collimated via a pair of cylindrical lenses 9c of the same type and input into the amplifying laser diode 13, after passing through which the radiation can once again be collimated by a further cylindrical lens 9c.

Figure 11:
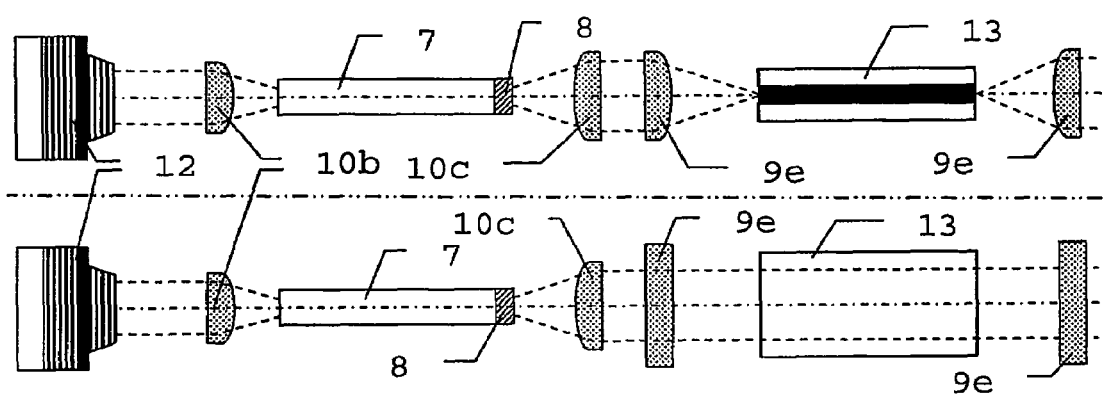
FIG. 11 shows the schematic diagram of a tenth laser source according to the invention, comprising a vertical emitting laser diode (VCSEL), a single-mode fiber as a mode-selective component and a laser diode as an amplifier.

FIG. 11 shows the schematic diagram of a tenth laser source according to the invention, comprising a vertically emitting laser diode (VCSEL) 12, a monomodal fiber 7 and an amplifying laser diode 13. The cavity of the laser source has a vertically emitting laser diode (VCSEL) 12, a lens 10b and a monomodal fiber 7 with output mirror 8. The radiation emitted from this cavity is input via a lens 10c and a cylindrical lens 9d into an amplifying laser diode 13, after passing through which the radiation can once again be collimated by a cylindrical lens 9e.

FIG. 12 and FIG. 13 schematically show the use of components with negative dispersion for compression of laser pulses. Because of the greater resonator length compared with an unmodified laser diode, which greater length is produced by the use of an external cavity, there is an increase in the pulse length, so that pulse compression as compensation is advantageous. In addition, the available pulse peak power can be increased by such compression.

FIG. 12 schematically shows an eleventh laser source according to the invention, comprising an edge-emitting laser diode 5, a monomodal fiber 7 and a pair 14 of gratings for pulse compression. In this embodiment, a pair 14 of gratings for producing negative dispersion is arranged in the cavity between edge-emitting laser diode 5 and monomodal fiber 7. In this region, the radiation is parallelized by a cylindrical lens 9f and a lens 10d.

FIG. 13 shows the schematic diagram of a twelfth laser source according to the invention, comprising an edge-emitting laser diode 5, a monomodal fiber 7 and a Gires Tournois interferometer 15 for pulse influencing or pulse compression. In this embodiment a Gires Tournois interferometer 15 is introduced into the cavity between edge-emitting diode 5 and monomodal fiber 7 for producing negative dispersion. In this region, the radiation is parallelized by a cylindrical lens 9g and a lens 10e. Moreover, by folding the beam path, a shortened design and hence compact integration in a geodesic device are permitted. Pulse influencing makes it possible, for example, to avoid or to correct a curved emission wavefront. This problem is relevant if transient-like mode formation occurs due to thermal changes of the cavity during the excitation. Radiation is thereby emitted earlier at the edge of the cavity than in the middle thereof, resulting in a curved emission wavefront which, for example in the case of an inclined target, can lead to incorrect measurements. In addition to further effects, a homogenizing effect can be achieved by the pulse-influencing action of dispersive or saturatable absorbing structures.

Of course, these figures which are shown are only examples of possible embodiments. Thus, the components used can also be used according to the invention in other combinations and sequences. In addition, it is within the ability of the person skilled in the art to use additional or alternative optical components, for example having a diffractive effect, and components having the same or a similar effect or functionality which are generally used in laser physics or laser technology. In the diagrams, necessary electronic control and supply parts and mounting components are not shown merely for reasons of clarity.

The invention claimed is:

1. Geodesic device comprising:
   a laser source comprising at least one radiation-producing laser diode, wherein an external cavity having at least one mode-selective component is coordinated with the radiation-producing laser diode, a single-mode characteristic of the emitted laser radiation being produced by the mode-selective component; and
   an optical receiver configured to receive radiation reflected from a target for distance measurement to the target, wherein the radiation reflected from the target is produced by the laser source.

2. Geodesic device according to claim 1, wherein the geodesic device is a total station or telemeter.

3. Geodesic device according to claim 1, wherein the mode-selective component is a monomodal fibre.

4. Geodesic device according to claim 3 wherein the monomodal fibre includes an end face in the form of a resonator mirror.

5. Geodesic device according to claim 3, wherein the monomodal fibre is in the form of a fibre having an inside differing geometrically from the cylindrical shape.

6. Geodesic device according to claim 5, wherein the monomodal fibre is in the form of a fibre having a conical or curved shape.

7. Geodesic device according to claim 3, wherein the monomodal fibre is in the form of a gradient fibre having a refractive index profile variable in the fibre direction.

8. Geodesic device according to claim 3, wherein the mode-selective component is a fibre having a structure which is periodic in space or a photonic fibre.

9. Geodesic device according to claim 8, wherein the mode-selective component is a PCF or PBG fibre.

10. Geodesic device according to claim 1, wherein the mode-selective component is an aperture, resonator mirror for a mode-selector resonator setup, or a thin-film optical fibre.

11. Geodesic device according to claim 1, wherein the emitted laser radiation has a pulse shape with a pulse duration of less than 500 ns.

12. Geodesic device according to claim 1, wherein single-mode operation of the radiation-producing laser diode is ensured by the mode-selective component.

13. Geodesic device according to claim 1, wherein the laser radiation of the laser-producing laser diode emitting in multimode operation is influenced by the mode-selective component.

14. Geodesic device according to claim 1, wherein the cavity has at least one input or output optical system.

15. Geodesic device according to claim 14, wherein the input or output optical system is anamorphotic.

16. Geodesic device according to claim 1, wherein the laser source has at least one further radiation amplifying laser diode.

17. Geodesic device, comprising:
   a laser source comprising at least one radiation-producing laser diode, wherein:
   an external cavity having at least one mode-selective component is coordinated with the radiation-producing laser diode, a single-mode characteristic of the emitted laser radiation being produced by the mode-selective component;
   the laser source has at least one further radiation amplifying laser diode; and
   wherein the at least one further radiation amplifying laser diode is configured to amplify a radiation input produced by the radiation-producing laser diode.

18. Geodesic device according to claim 1, wherein the components of the cavity are arranged on a common baseplate.

19. Geodesic device according to claim 1, wherein the radiation-producing laser diode is in the form of a VCSEL laser or NECSEL laser.

20. Geodesic device, comprising:
   a laser source comprising at least one radiation-producing laser diode, wherein an external cavity having at least one mode-selective component is coordinated with the radiation-producing laser diode, a single-mode characteristic of the emitted laser radiation being produced by the mode-selective component, wherein the laser source for emission of laser radiation is formed with a flat emission wavefront.

21. Geodesic device according to claim 20, wherein the laser source for emission of laser radiation is formed with a flat emission wavefront by means of a pulse-shaping component in the cavity.

22. Geodesic device according to claim 1, wherein the laser source includes a saturatable absorbing and/or dispersive element.

23. Geodesic device according to claim 22, wherein the saturatable absorbing and/or dispersive element includes a pulse-shaping component.

24. Geodesic device, comprising:
   a laser source comprising at least one radiation-producing laser diode, wherein an external cavity having at least one mode-selective component is coordinated with the radiation-producing laser diode, a single-mode characteristic of the emitted laser radiation being produced by the mode-selective component, wherein the laser source includes a saturatable absorbing and/or dispersive element that includes a Gires Tournois interferometer, a pair of gratings or a pair of prisms.

25. Geodesic device according to claim 1, wherein the radiation-producing laser diode is wavelength-stabilized.

26. Geodesic device according to claim 1, further comprising a beam-shaping optical system arranged downstream of the laser source.

* * * * *